G. PAWSON.
TAPPING ATTACHMENT FOR DRILL PRESSES AND OTHER MACHINES.
APPLICATION FILED NOV. 26, 1919.
1,433,842.
Patented Oct. 31, 1922.
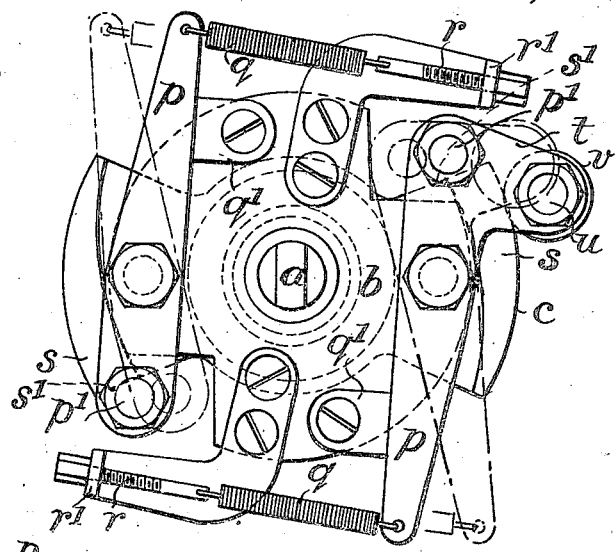
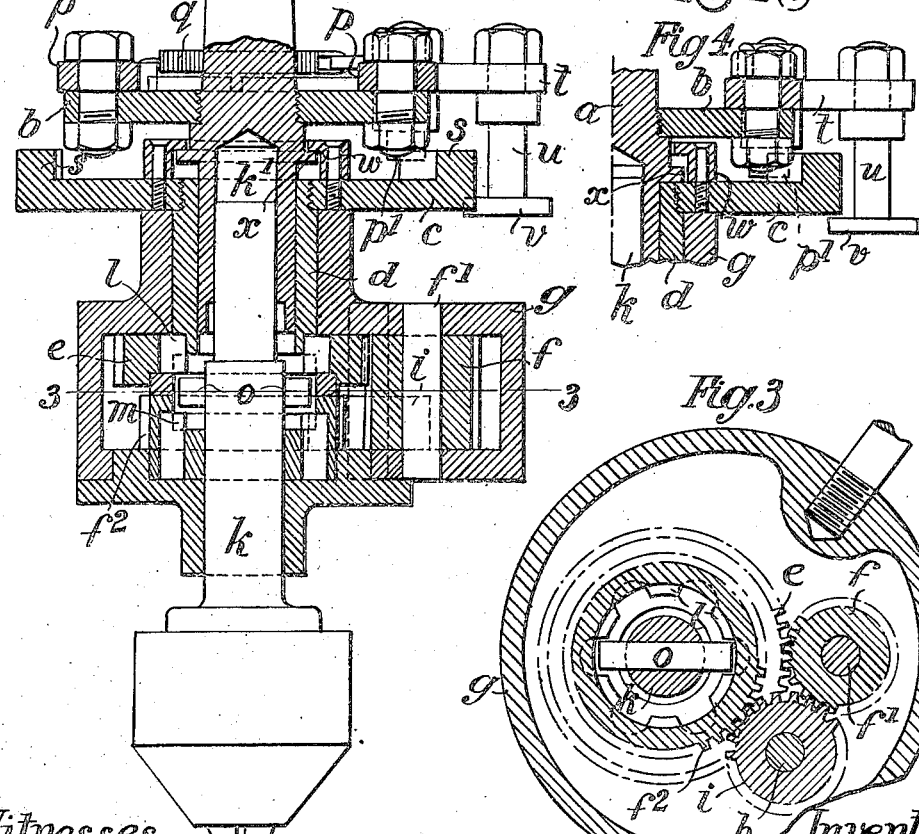
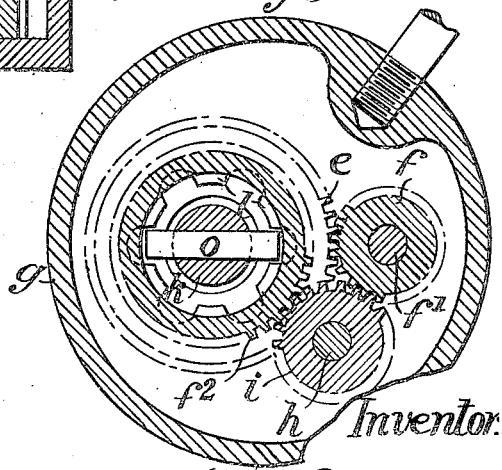
Witnesses.
J. K. Moore
R. E. Barry
Inventor.
Gilbert Pawson Patented Oct. 31, 1922.

1,433,842

UNITED STATES PATENT OFFICE.

GILBERT PAWSON, OF LONDON, ENGLAND.

TAPPING ATTACHMENT FOR DRILL PRESSES AND OTHER MACHINES.

Application filed November 26, 1919. Serial No. 340,923.

*To all whom it may concern:*

Be it known that I, GILBERT PAWSON, a subject of the King of Great Britain, residing at Queen's Gate Works, Kensington Gore, London, England, have invented new and useful Improvements in Tapping Attachments for Drill Presses and Other Machines, of which the following is a specification.

My invention relates to tapping attachments such as are used in connection with drilling and other machines for automatically severing the driving connection between the driving spindle and the tap should the latter, when entering a blind hole, strike the bottom of the said hole or otherwise meet with a resistance which might cause the breakage of the tap and wherein provision is made for reversing the direction of rotation for withdrawing the tap from the hole.

Apparatus of this kind has heretofore been constructed wherein the spindle carrying the tool holder is made in two parts capable of a certain amount of longitudinal movement relatively to one another, in such a manner, that a clutch member on the longitudinal moving part will be caused to engage either with a clutch part directly driven or with another clutch part driven through the medium of gearing, so that the clutch member when engaging with one clutch part will be driven in one direction and when in engagement with the other clutch part in the opposite direction, and wherein a friction clutch is provided to transmit the drive to the tap.

In practice, however, it is difficult to so adjust the friction clutch that, on the one hand, it shall transmit the required torque without yielding and that, on the other hand, it shall operate to allow the tap to come to rest when the predetermined torque is exceeded, and the object of my invention is to provide means whereby these results can be obtained without the employment of a friction clutch.

According to my invention I employ an arrangement of tappets and yielding levers or the like which will engage with one another under normal conditions but slip or pass one another when a given torque is exceeded.

My invention will be readily understood by reference to the accompanying drawing, in which:—

Figure 1 is a sectional elevation of my improved tapping attachment.

Figure 2 is a plan, and

Figure 3 is a section on the line 3—3, Figure 1.

Figure 4 is a view of certain of the parts shown in Figure 3 but in a different position.

$a$ indicates the shank of the attachement which, as shown, is made of cone shape to fit the socket or chuck on the spindle of a drilling machine or lathe. $b$ indicates a driving plate which is secured to the said shank and rotates therewith and $c$ another plate, which I term the driven plate, which receives its motion from the driving plate and which is secured to a sleeve $d$ on the lower part of the spindle $a$, and carries at its lower end a gear wheel $e$ which rotates with the driven plate.

This gear wheel $e$ engages with an idle gear wheel $f$, mounted on a spindle $f^1$ in a gear box $g$ on the sleeve $d$ hereinbefore referred to, and on another spindle $h$ in the said gear box is mounted another idle wheel $i$ which in turn engages with the idle wheel $f$ and also with another gear wheel $f^2$ in the said gear box.

Mounted in the lower part of the said box $g$ is the tap holding or chuck spindle $k$, the upper end of which projects into, and is capable of, sliding within a longitudinal hole $k^1$ in the spindle $a$.

Upon the interior of the gear wheel $e$ is formed a number of clutch teeth $l$ and upon the interior of the gear wheel $f^2$ is formed another series of clutch teeth $m$, and through the tool spindle $k$ extends a clutch member $o$ which, when in engagement with the teeth $l$ of the wheel $e$ will be directly driven from the plate $c$, whilst when the said clutch member $o$ is in engagement with the teeth $m$ of the wheel $f^2$ it will be driven in the reverse direction owing to the fact that the said gear wheel $f^2$ will receive its motion from the wheel $e$ through the medium of the idle wheels $f$ and $i$.

Motion is transmitted from the driving plate $b$ to the driven plate $c$ through the medium of a series of levers $p$, $p$ pivotally mounted upon the said driving plate $b$ and having connected to them at one end rollers or studs $p^1$, $p^1$, whilst at the other end the said levers have connected to them springs $q$ which normally tend to draw the said levers up against stops $q^1$, $q^1$; the tension of these springs is adjustable by means of screws $r$ in brackets $r^1$. Upon the driven plate $c$ are formed abutments $s$ with one end $s^1$ of which, when the levers $p$ are in their normal positions, the rollers or studs $p^1$ will engage, so that as the driving plate $b$ is rotated motion will be transmitted to the driven plate $c$ through the said studs $p^1$. The said ends $s^1$ of the abutments $s$ are somewhat inclined so that as the driving and driven plates are being rotated any abnormal resistance to the rotation of the tool will cause the studs $p^1$ to slip off the said ends and move the levers $p$ from the position shown in full lines in Figure 2 to that shown in dotted lines. This movement allows the studs $p^1$ to slide quietly and without shock along and past the inner inclined faces of the abutments $s$ when the levers $p$ again rest against their stops $q^1$ ready to again take up the drive whilst the driven plate $c$ remains at rest, the springs $q$, $q$ being so adjusted that the strain exerted by the studs upon the abutments will be insufficient to break the tap or other tool held in the chuck spindle $k$. Whilst the driven plate $c$ remains at rest the levers $p$ will oscillate at each revolution of the said driving plate. When this takes place the operator, without stopping the rotation of the driving plate $b$ lifts the drill spindle whereupon the clutch teeth $l$ are disengaged from the member $o$ and the clutch teeth $m$ engaged with the said member, the latter being prevented from rising by the engagement of the tapping tool with the work, so that, as hereinbefore stated, rotary motion in the reverse direction will be transmitted to the spindle $k$ through the gearing described, the gearing being so proportioned that this reverse movement will be at quicker rotation than in the other direction.

In order that during this reverse movement a positive drive shall be transmitted to driven plate $c$ I provide upon one of the levers $o$ an arm $t$ carrying a stud $u$, the head $v$ of which is normally in contact with the periphery of the said driven plate, as shown in Figure 1, but which during the tapping operation is below the said plate $c$ shown in Figure 4. The necessary longitudinal movement between the driving and driven plates is provided for by arranging upon the said driving plate a flanged ring $w$ which engages with a flange $x$ on the spindle $a$. During the tapping operation the pressure of the tap against the work being operated upon lifts the gear box and the parts connected therewith so that the flange $x$ is pressed upon by the plate $c$ as shown in Figure 4. When, however, the tap is being reversed or "backed out" the flange $x$ bears beneath the flange of the ring $w$ so that the head $v$ is in the position shown in Figure 1, and prevents the levers $p$, on which it is mounted, from moving from the full line position in Figure 2, so that the pin $p^1$ thereon imparts a positive drive to the plate $c$.

By my improved construction all strain is removed from the clutch and gear mechanism during the reversal of the tap thus allowing the clutch member $o$ to drop freely from engagement with the teeth $l$ into engagement with the teeth $m$, and the predetermined torque at which the release gear operates is not effected by changes of temperature, lubrication, wear or dirt as is the case in apparatus of the friction type.

Claims.

1. A tapping attachment comprising a chuck spindle, a driving plate and a driven plate, means whereby motion may be transmitted from said driving plate to said driven plate consisting of a series of levers pivotally mounted on said driving plate, said levers being actuated by springs and having connected at one end thereof studs, which engage abutments on said driven plate, and means for throwing said studs out of engagement with said abutments.

2. A tapping attachment as claimed in claim 3 in which the means for throwing the studs out of engagement with the abutments, consists in providing an inclined end on said abutments, whereby the studs may slip off of said ends in case of any abnormal resistance to the tool.

3. A tapping attachment comprising a chuck spindle, a driving plate and a driven plate capable of limited movement towards and away from one another, means whereby motion may be transmitted from said driving plate to said driven plate consisting of a series of levers pivotally mounted on said driving plate, said levers being actuated by springs and having connected to one end thereof studs which engage abutments on said driven plate, means for throwing said studs out of engagement with said abutments when the driving plate is moved towards the driven plate when tapping and means for preventing the studs from being thrown out of engagement with the abutments when the driven plate is lifted towards the driving plate when reversing.

4. A tapping attachment as claimed in claim 3, wherein the means for preventing the studs on the levers from being thrown out of engagement with the abutments, comprise a stud on one of the levers having an enlargement or head to contact with the periphery of the driven plate.

GILBERT PAWSON.